US009787200B2

(12) United States Patent
Fu et al.

(10) Patent No.: US 9,787,200 B2
(45) Date of Patent: *Oct. 10, 2017

(54) RESONANT CONVERTERS WITH SYNCHRONOUS RECTIFIER FEEDBACK

(71) Applicant: Futurewei Technologies, Inc., Plano, TX (US)

(72) Inventors: Dianbo Fu, Frisco, TX (US); Heping Dai, Plano, TX (US); Liming Ye, Frisco, TX (US); Daoshen Chen, Allen, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/061,717

(22) Filed: Mar. 4, 2016

(65) Prior Publication Data

US 2016/0190946 A1 Jun. 30, 2016

Related U.S. Application Data

(63) Continuation of application No. 14/071,446, filed on Nov. 4, 2013, now Pat. No. 9,281,752.

(51) Int. Cl.
*H02M 3/335* (2006.01)
*H02M 1/00* (2006.01)

(52) U.S. Cl.
CPC ... *H02M 3/33546* (2013.01); *H02M 3/33576* (2013.01); *H02M 2001/0058* (2013.01); *Y02B 70/1433* (2013.01); *Y02B 70/1491* (2013.01)

(58) Field of Classification Search
CPC .......................... H02M 3/33515; H02M 3/157
See application file for complete search history.

(56) References Cited

U.S. PATENT DOCUMENTS

| 2015/0229201 A1* | 8/2015 | Lee ............... H02M 1/12 363/21.02 |
| 2016/0079790 A1* | 3/2016 | Kleinpenning ..... H02M 3/1588 320/107 |

FOREIGN PATENT DOCUMENTS

JP       2008-278723       *  5/2007  ............... H02M 3/28

OTHER PUBLICATIONS

"AN-6208 Secondary-Side Synchronous Rectifier (SR) for LLC Resonant Converter Using FAN6208," Rev. 1.0.1, Fairchild Semiconductor, Mar. 2011, pp. 1-10.

\* cited by examiner

*Primary Examiner* — Harry Behm
*Assistant Examiner* — Peter Novak
(74) *Attorney, Agent, or Firm* — Slater Matsil, LLP

(57) ABSTRACT

A method comprises detecting a signal representing a drain-to-source voltage of a switch of a synchronous rectifier of an inductor-inductor-capacitor (LLC) resonant converter, comparing the signal with a predetermined threshold, generating a first logic state if the drain-to-source voltage is greater than the predetermined threshold, generating a second logic state if the drain-to-source voltage is less than the predetermined threshold and in response to the first logic state and the second logic state, adjusting a switching frequency of the LLC resonant converter such that the switching frequency moves back and forth across a boundary of body diode conduction, wherein a frequency difference between the switching frequency and a resonant frequency of the LLC resonant converter is less than or equal to one frequency adjustment step.

20 Claims, 6 Drawing Sheets

RESONANT CONVERTERS WITH SYNCHRONOUS RECTIFIER FEEDBACK

This application is a continuation of U.S. patent application Ser. No. 14/071,446, entitled "Resonant Converters with Synchronous Rectifier Feedback," filed on Nov. 4, 2013, which application is incorporated herein by reference.

TECHNICAL FIELD

The present invention relates to a resonant converter, and, in particular embodiments, to a control mechanism for resonant converters.

BACKGROUND

A telecommunication network power system usually includes an AC-DC stage converting the power from the AC utility line to a 48V DC distribution bus and a DC-DC stage converting the 48V DC distribution bus to a plurality of voltage levels for all types of telecommunication loads. Both stages may comprise isolated DC-DC converters. Isolated DC-DC converters can be implemented by using different power topologies, such as flyback converters, forward converters, half bridge converters, full bridge converters, inductor-inductor-capacitor (LLC) resonant converters and the like.

As technologies further advance, bus converters have been widely employed in the telecommunication industry. The bus voltages may be divided into three categories, a 12V bus voltage converted from a 48V input dc power supply, a 48V bus voltage converted from a 380V input dc power supply and a 12V bus voltage converted from a 380V input dc power supply. A bus converter not only converts the input voltage from a higher level to a lower level, but also provides isolation through a magnetic device such as transformers and/or the like.

The intermediate bus voltage such as 12V may function as an input power bus for a plurality of downstream non-isolated power converters. The downstream non-isolated power converters may be implemented as step-down dc/dc converters such as buck converters, step-up dc/dc converters such as boost converters, linear regulators, any combinations thereof and/or the like. The downstream non-isolated power converters operate under a tight control loop so that fully regulated output voltages are fed into their respective loads.

As power consumption has become more important, there may be a need for high power density and high efficiency bus converters. LLC resonant converters have become the preferred choice for achieving high performance (e.g., high power density and high efficiency) because LLC resonant converters are capable of reducing switching losses through zero voltage switching and/or zero current switching.

SUMMARY OF THE INVENTION

These and other problems are generally solved or circumvented, and technical advantages are generally achieved, by preferred embodiments of the present invention which provide an inductor-inductor-capacitor (LLC) resonant power converter having high efficiency through zero voltage switching and/or zero current switching.

In accordance with an embodiment, a method comprises detecting a signal representing a drain-to-source voltage of a switch of a synchronous rectifier of an inductor-inductor-capacitor (LLC) resonant converter, comparing the signal with a predetermined threshold, generating a first logic state if the drain-to-source voltage is greater than the predetermined threshold, generating a second logic state if the drain-to-source voltage is less than the predetermined threshold and in response to the first logic state and the second logic state, adjusting a switching frequency of the LLC resonant converter such that the switching frequency moves back and forth across a boundary of body diode conduction, wherein a frequency difference between the switching frequency and a resonant frequency of the LLC resonant converter is less than or equal to one frequency adjustment step.

In accordance with another embodiment, a method comprises detecting a drain voltage of a transistor of a resonant converter, wherein the resonant converter comprises an input switch network coupled to a power source, wherein the input switch network comprises a plurality of power switches, a resonant tank coupled to the plurality of power switches, a transformer coupled to the resonant tank and an output stage coupled to the transformer, wherein the output stage comprises the transistor.

The method further comprises comparing the drain voltage with a predetermined voltage threshold, wherein the drain voltage is coupled to a negative input of a comparator; and the predetermined voltage threshold is coupled to a positive input of the comparator, generating a logic state based upon an output of the comparator and adjusting, by a control circuit, a switching frequency of the resonant converter based upon the logic state, wherein the control circuit is configured such that the switching frequency of the resonant converter moves back and forth at a boundary between body diode conduction and transistor conduction.

In accordance with yet another embodiment, a method comprises detecting a signal across a drain and a source of a transistor of a resonant converter, wherein the resonant converter comprises a power stage comprising an input switch network coupled to a power source, wherein the input switch network comprises a plurality of power switches, a resonant tank coupled to the plurality of power switches, an isolation device coupled to the resonant tank and an output stage coupled to the isolation device through a rectifier, wherein the rectifier comprises the transistor, and wherein a drain of the transistor is coupled to the isolation device and a source of the transistor is coupled to ground and a control circuit coupled to the power switches, wherein the control circuit generates a plurality of gate drive signals for the power switches.

The method further comprises comparing the signal with a predetermined threshold to generate a logic state and based upon the logic state, configuring the resonant converter such that a switching frequency of the resonant converter moves back and forth within a frequency band.

An advantage of a preferred embodiment of the present invention is improving a power converter's efficiency through detecting the body diode conduction of the power converter.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a high efficiency control mechanism for an inductor-inductor-capacitor (LLC) resonant converter. The invention may also be applied, however, to a variety of resonant converters. Hereinafter, various embodiments will be explained in detail with reference to the accompanying drawings.

Figure 1:
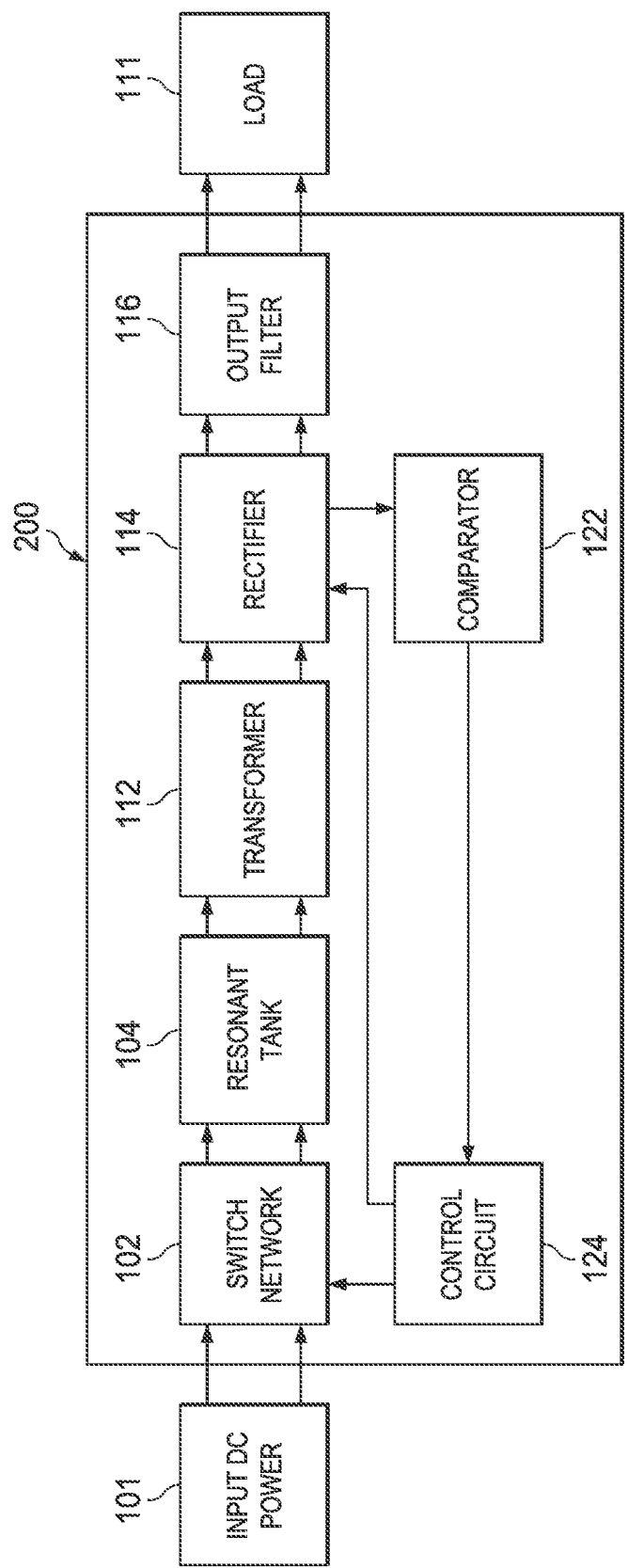
FIG. 1 illustrates a block diagram of an LLC resonant converter in accordance with various embodiments of the present disclosure.

FIG. 1 illustrates a block diagram of an LLC resonant converter in accordance with various embodiments of the present disclosure. The LLC resonant converter 200 is coupled between an input dc power source 101 and a load 111. The input dc power source 101 may be telecommunication power supplies converting a utility line voltage to a dc voltage. Alternatively, the input dc power source 101 may be a solar panel array. Furthermore, the input dc power source 101 may be an energy storage device such as rechargeable batteries, fuel cells and/or the like. The load 111 represents the power consumed by a circuit coupled to the LLC resonant converter 200. Alternatively, the load 111 may refer to downstream converters coupled to the output of the LLC resonant converter 200.

The LLC resonant converter 200 may comprise a switch network 102, a resonant tank 104, a transformer 112, a rectifier 114 and an output filter 116. As shown in FIG. 1, the switch network 102, the resonant tank 104, the transformer 112, the rectifier 114 and the output filter 116 are coupled to each other and connected in cascade between the input dc power source 101 and the load 111.

The switch network 102 may comprise primary side switches of a half-bridge resonant converter according to some embodiments. Alternatively, the switch network 102 may be of the primary side switches of other bridge converters such as a full-bridge resonant converter, a push-pull resonant converter and the like. The detailed configuration of the switch network 102 will be described below with respect to FIG. 2.

The resonant tank 104 may be implemented in a variety of ways. In some embodiments, the resonant tank 104 comprises a first series resonant inductor, a first parallel resonant inductor and a first series resonant capacitor (shown in FIG. 2 respectively).

The first series resonant inductor and the first parallel resonant inductor may be implemented as external inductors. A person skilled in the art will recognize that there may be many variation, alternatives and modifications. For example, the first series resonant inductor may be implemented as a leakage inductance of the transformer 112.

In sum, the resonant tank 104 includes three key resonant elements, namely the first series resonant inductor, the first series resonant capacitor and the parallel resonant inductor. Such a configuration is commonly referred to as an LLC resonant converter. According to the operating principle of LLC resonant converters, at a switching frequency approximately equal to the resonant frequency of the resonant tank 104, the resonant tank 104 helps to achieve zero voltage switching for the primary side switching elements and zero current switching for the secondary side switching elements.

The LLC resonant converter 200 may further comprise a transformer 112, a rectifier 114 and an output filter 116. The transformer 112 provides electrical isolation between the primary side and the secondary side of the LLC resonant converter 200. In accordance with an embodiment, the transformer 112 may be formed of two transformer windings, namely a primary transformer winding and a secondary transformer winding. Alternatively, the transformer 112 may have a center tapped secondary so as to have three transformer windings including a primary transformer winding, a first secondary transformer winding and a second secondary transformer winding.

It should be noted that the transformers described above and throughout the description are merely examples, which should not unduly limit the scope of the claims. One of ordinary skill in the art would recognize many variations, alternatives, and modifications. For example, the transformer 112 may further comprise a variety of bias windings and gate drive auxiliary windings.

The rectifier 114 converts an alternating polarity waveform received from the output of the transformer 112 to a single polarity waveform. When the transformer 112 is of a center tapped secondary, the rectifier 114 may be formed of a pair of switching elements such as n-type metal oxide semiconductor (NMOS) transistors. The pair of switching elements may be alternatively referred to as a secondary synchronous rectifier. In alternative embodiments, the rectifier 114 may be formed of a pair of diodes. On the other hand, when the transformer is of a single secondary winding, the rectifier 114 may be a full-wave rectifier coupled to the single secondary winding of the transformer 112.

Furthermore, the rectifier 114 may be formed by other types of controllable devices such as metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices and/or the like. The detailed operation and structure of the rectifier 114 are well known in the art, and hence are not discussed herein.

The LLC resonant converter 200 may further comprise a comparator 122 and a control circuit 124. The comparator 122 may be coupled to the rectifier 114. The control circuit 124 has an input coupled to the comparator 122 and two outputs coupled to the switch network 102 and the rectifier 114 respectively. The comparator 122, as shown in FIG. 1, detects a signal from the rectifier 114. The detected signal may include a variable indicating whether the LLC resonant converter 200 operates at the resonant frequency of the resonant tank 104.

Each switching element of the rectifier 114 may comprise a body diode. The body diode may conduct after the switch has been turned off if the current flowing through the switch is from the source of the switch to the drain of the switch.

In some embodiments, when the LLC resonant converter 200 operates at its resonant frequency, a negative current does not occur in the secondary side of the transformer 112. As a result, the body diodes of the switches of the rectifier 114 may not conduct. On the other hand, when the switching frequency of the LLC resonant converter 200 is away from its resonant frequency, there may be a negative current flowing through the secondary side of the transformer. As a result, the body diodes of the switches of the rectifier 114 may conduct during the dead time of the secondary synchronous rectifier. The operation principles of body diodes are well known, and hence are not discussed in detail herein.

In some embodiments, the comparator 122 detects the voltage across one switch of the rectifier 114 and compares the detected signal with a predetermined threshold to generate a logic signal. The logic signal is sent to the control circuit 124. If the logic signal is a logic 1, the control circuit 124 reduces the switching frequency of the LLC resonant converter 200 until the output of the comparator 122 generates a logic 0. On the other hand, if the logic signal is a logic 0, the control circuit 124 increases the switching frequency of the LLC resonant converter 200 until the output of the comparator 122 generates a logic 1.

In sum, the control circuit 124 adjusts the switching frequency of the LLC resonant converter 200 to prevent the body diodes of the rectifier 114 from being conducted. As a result, the LLC resonant converter 200 is forced to operate at a frequency close to its resonant frequency. Such a frequency helps the LLC resonant converter 200 achieve higher efficiency through zero voltage switching and/or zero current switching.

The output filter 116 is used to attenuate the switching ripple of the LLC resonant converter 200. According to the operation principles of isolated dc/dc converters, the output filter 116 may be an L-C filter formed by an inductor and a plurality of capacitors. One person skilled in the art will recognize that some isolated dc/dc converter topologies such as forward converters may require an L-C filter. On the other hand, some isolated dc/dc converter topologies such as LLC resonant converters may include an output filter formed by a capacitor. One person skilled in the art will further recognize that different output filter configurations apply to different power converter topologies as appropriate. The configuration variations of the output filter 116 are within various embodiments of the present disclosure.

Figure 2:
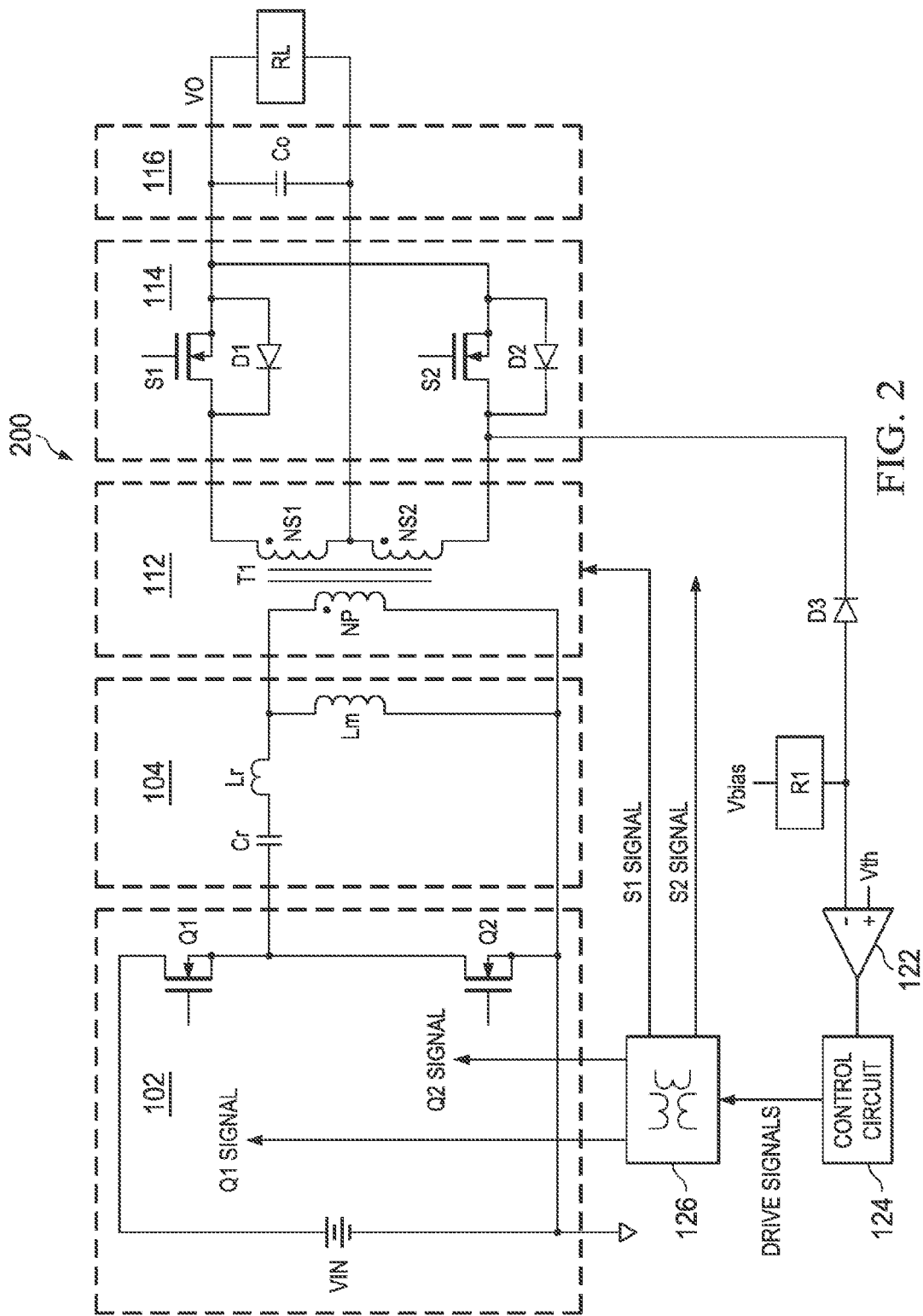
FIG. 2 illustrates a schematic diagram of the LLC resonant converter shown in FIG. 1 in accordance with various embodiments of the present disclosure.

FIG. 2 illustrates a schematic diagram of the LLC resonant converter shown in FIG. 1 in accordance with various embodiments of the present disclosure. The switch network 102 includes two switching elements, namely Q1 and Q2. As shown in FIG. 2, switching elements Q1 and Q2 are connected in series. The common node of the switching elements Q1 and Q2 is coupled to a first input terminal of the resonant tank 104. A second input terminal of the resonant tank 104 is coupled to ground.

The switching elements Q1 and Q2 form a primary side switching network of a half bridge resonant converter. According to some embodiments, switching elements Q1 and Q2 are implemented as MOSFET or MOSFETs connected in parallel, any combinations thereof and/or the like.

According to alternative embodiments, the primary switches (e.g., switch Q1) may be an insulated gate bipolar transistor (IGBT) device. Alternatively, the primary switches can be any controllable switches such as integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices and/or the like.

It should be noted that while the example throughout the description is based upon a half bridge LLC resonant converter (e.g., half bridge LLC resonant converter shown in FIG. 2), the LLC resonant converter 200 shown in FIG. 2 may have many variations, alternatives, and modifications. For example, full bridge converters, push-pull converters may be alternatively employed. The full bridge resonant converter illustrated herein is limited solely for the purpose of clearly illustrating the inventive aspects of the various embodiments. The present invention is not limited to any particular power topology.

It should further be noted that while FIG. 2 illustrates two switches Q1 and Q2, various embodiments of the present disclosure may include other variations, modifications and alternatives. For example, a separate capacitor may be connected in parallel with each switch of the primary side switching network. Such a separate capacitor helps to better control the timing of the resonant process of the LLC resonant converter 200.

FIG. 2 further illustrates the resonant tank 104 coupled between the switch network 102 and the transformer 112. The resonant tank 104 is formed by a first series resonant inductor Lr, a first series resonant capacitor Cr1 and a first parallel inductance Lm. As shown in FIG. 2, the first resonant inductor Lr and the first resonant capacitor Cr1 are connected in series and further coupled to the primary side of the transformer 112.

It should be noted while FIG. 2 shows the first series resonant inductor Lr is an independent component, the first series resonant inductor Lr may be replaced by the leakage inductance of the transformer 112. In other words, the leakage inductance (not shown) may function as the first series resonant inductor Lr.

The transformer 112 may be of a primary winding and a center tapped secondary winding. The primary winding is coupled to the resonant tank 104 as shown in FIG. 2. The secondary winding is coupled to the load 111 through the rectifier 114, which is formed by switches S1 and S2. There may be two diodes D1 and D2 connected in parallel with the switches 51 and S2 respectively. It should be noted that diodes D1 and D2 are not separate components. In fact, diodes D1 and D2 are body diodes of the switches S1 and S2 respectively.

It should be noted the transformer structure shown in FIG. 2 is merely an example. One person skilled in the art will recognize many alternatives, variations and modification. For example, the secondary side of the transformer 112 may be a single winding. As a result, the secondary side may employ a synchronous rectifier formed by four switching elements (a.k.a. full wave rectifier). The operation principle of a synchronous rectifier coupled to a single secondary winding or a center tapped transformer secondary side is well known, and hence is not discussed in further detail herein.

It should further be noted that the power topology of the LLC resonant converter 200 may be not only applied to the rectifier as shown in FIG. 2, but also applied to other secondary configurations, such as voltage doubler rectifiers, current doubler rectifiers, any combinations thereof and/or the like.

The comparator 122 has a positive input terminal and a negative input terminal. In some embodiments, the negative input terminal is coupled to the drain of the switch S2 through a diode D3. The diode D3 functions as a blocking diode, which helps to isolate the comparator 122 from the positive drain voltage across the switch S2. As a result, the comparator 122 may be implemented as a low voltage comparator.

A bias voltage is coupled to the negative input terminal of the comparator 122 through a resistor R1. Depending on design needs, in some embodiments, the bias voltage Vbias may be 3.3 V, 5 V, 12 V and/or the like. Likewise, the resistor R1 may be 1 Kohm, 10 Kohm and/or the like.

A predetermined threshold Vth is coupled to the positive input terminal of the comparator 122. In some embodiments, Vth is about −0.6 V. According to the operating principles of comparators, the comparator 122 may generate a logic 0 when the detected signal at the negative input terminal is greater than the predetermined threshold Vth. On the other hand, the comparator 122 may generate a logic 1 when the detected signal at the negative input terminal is less than the predetermined threshold Vth.

In operation, when body diode D2 conducts, the voltage across the drain-to-source of the switch S2 is about −0.6 V. The bias voltage Vbias is configured such that the voltage at the negative input terminal of the comparator 122 is less than the predetermined threshold Vth. As a result, the comparator 122 generates a logic 1. On the other hand, when body diode D2 does not conduct, the voltage across the drain-to-source of the switch S2 is greater than −0.6 V. The bias voltage Vbias is configured such that the voltage at the negative input terminal of the comparator 122 is greater than the predetermined threshold Vth. As a result, the comparator 122 generates a logic 0.

The control circuit 124 receives the logic signal from the comparator 122 and adjusts the switching frequency of the switch network 102 and the rectifier 114 through a driver 126. In particular, if the logic signal is a logic 1, the control circuit 124 reduces the switching frequency of the switch network 102 and the rectifier 114 until the output of the comparator 122 generates a logic 0. On the other hand, if the logic signal is a logic 0, the control circuit 124 increases the switching frequency of the switch network 102 and the rectifier 114 until the output of the comparator 122 generates a logic 1. The detailed flow chart of adjusting the switching frequency of the switch network 102 will be illustrated below with respect to FIG. 5.

The driver 126 may include an isolation device such as a signal transformer. Through the signal transformer, the drive signals for the high side switch (e.g., switch Q1), low side switch (e.g., switch Q2) and secondary switches (e.g., switches S1 and S2) are generated from the windings of the signal transformer. The operating principle of signal transformers is well known, and hence is not discussed herein.

Figure 3:
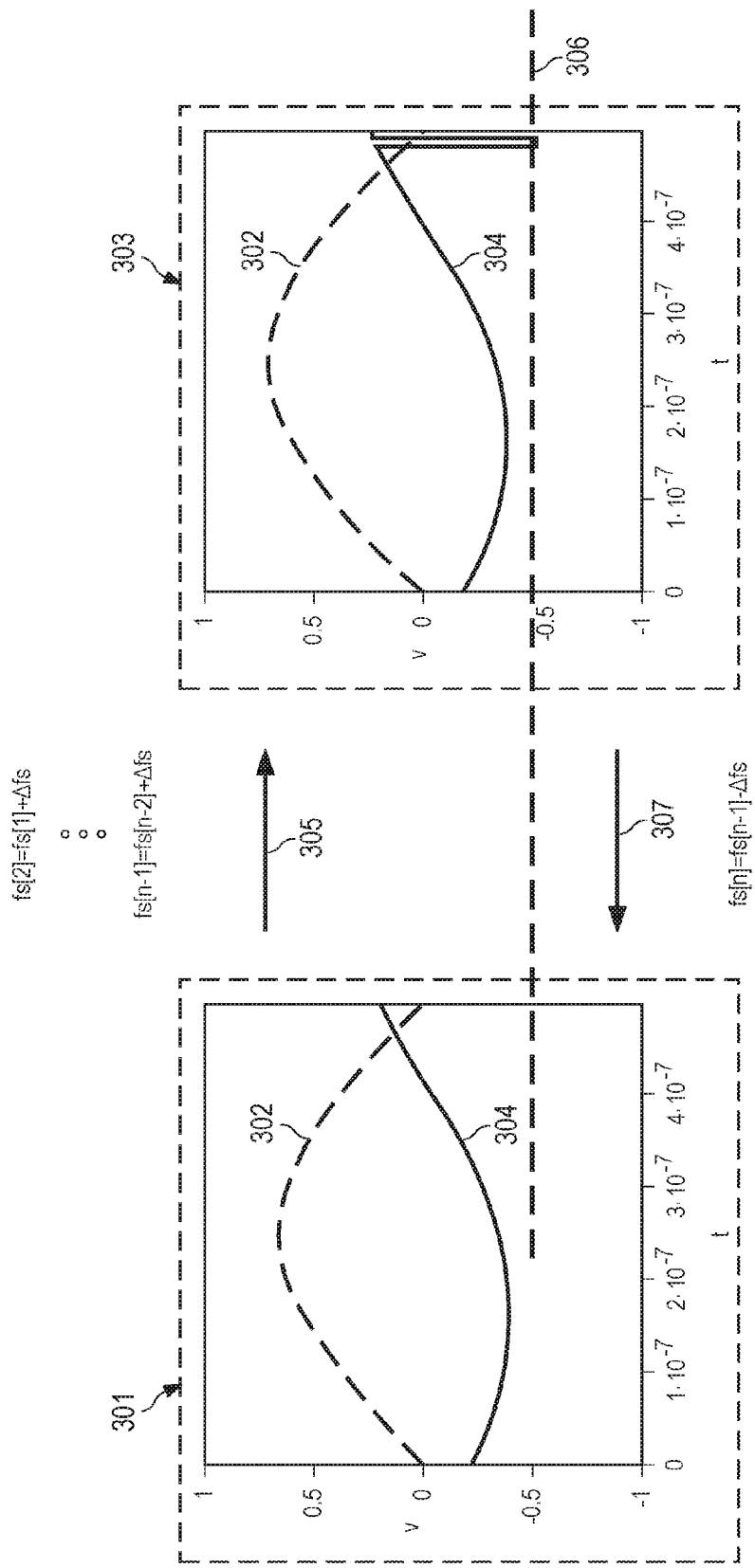
FIG. 3 illustrates key switching waveforms of a first illustrative operating mode of the LLC resonant converter shown in FIG. 2 in accordance with various embodiments of the present disclosure.

FIG. 3 illustrates key switching waveforms of a first illustrative operating mode of the LLC resonant converter shown in FIG. 2 in accordance with various embodiments of the present disclosure. The horizontal axis of FIG. 3 represents intervals of time. The unit of the horizontal axis is second. The vertical axis represents the voltage across the drain-to-source of the switch S2 shown in FIG. 2.

The switching waveform 302 illustrates the voltage across the drain-to-source of the switch S2 shown in FIG. 2. The waveform 304 shows the current flowing through the switch S2. A dashed rectangle 301 illustrates the switching waveforms when the LLC resonant converter 200 (shown in FIG. 2) operates at a switching frequency lower than the resonant frequency of the LLC resonant converter 200.

As shown in FIG. 3, the switching waveform 304 shows the body diode of the switch S2 does not conduct a current during a turn-off transition of the switch S2. The comparator 122 detects the drain-to-source voltage of the switch S2 and compares it with a predetermined threshold, which is indicated by a dashed line 306. In some embodiments, the predetermined threshold is about −0.6 V. Since the drain-to-source voltage of the switch S2 is greater than the predetermined threshold in the dashed rectangle 301, a logic state "0" is generated at the output of the comparator 122.

The control circuit 124 receives the logic 0 from the comparator 122. In response to the logic 0, the control circuit 124 increases the switching frequency of the switch network 102 and the rectifier 114 through the driver 126. The step of the switching frequency increase is defined as Δfs as shown in FIG. 3. The value of Δfs may vary depending on different application and design needs.

The comparator 122 keeps detecting the drain-to-source voltage of the switch S2 and sends a corresponding logic signal to the control circuit 124. The control circuit 124 increases the switching frequency of the switch network 102 until there is a logic state change. For example, after the switching frequency of the switch network 102 and the rectifier 114 has been increased to a higher level (e.g., a level higher than the resonant frequency), the body diode of the switch S2 may conduct a current during the turn-off transition of the switch S2. A dashed rectangle 303 shows the switching waveforms when the body diode of the switch S2 conducts a current. Since there is a current (a.k.a. a negative current) flowing through the body diode, the drain-to-source voltage of the switch S2 may drop below the predetermined threshold Vth. As a result, the comparator 122 may generate a logic 1.

In response to the logic 1 sent from the comparator 122, the control circuit 124 reduces the switching frequency of the switch network 102 and the rectifier 114. The step of the switching frequency decrease may be the same as the step of the switching frequency increase. Alternatively, the step of the switching frequency decrease may be different from the step of the switching frequency increase depending on different applications and design needs.

As shown in FIG. 3, the arrows 305 and 307 indicate that the switching frequency of the switch network 102 moves back and forth at the boundary of body diode conduction. As such, the switch network 102 operates either at the resonant frequency or at a frequency close to the resonant frequency (e.g., Δfs from the resonant frequency).

One advantageous feature of the control mechanism shown in FIG. 3 is that the LLC resonant converter 200 may operate at a frequency close to the resonant frequency of the resonant tank 104. As such, the LLC resonant converter 200 can achieve both zero voltage switching for the primary side switches and zero current switching for the secondary side switches. The soft switching operation of the primary and secondary switches helps to achieve high efficiency.

Figure 4:
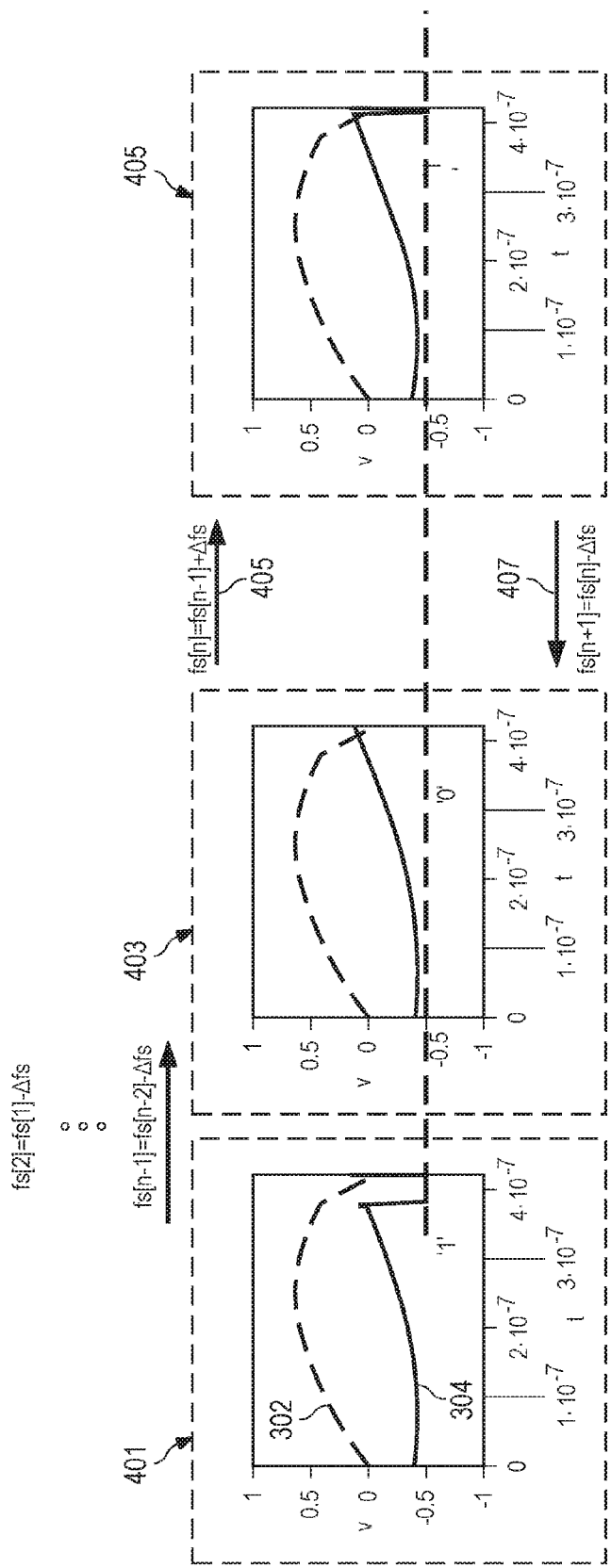
FIG. 4 illustrates key switching waveforms of a second illustrative operating mode of the LLC resonant converter shown in FIG. 2 in accordance with various embodiments of the present disclosure.

FIG. 4 illustrates key switching waveforms of a second illustrative operating mode of the LLC resonant converter shown in FIG. 2 in accordance with various embodiments of the present disclosure. The horizontal axis of FIG. 4 represents intervals of time. The unit of the horizontal axis is second. The vertical axis of FIG. 4 represents the voltage across the drain-to-source of the switch S2 shown in FIG. 2.

The switching waveform 302 illustrates the voltage across the voltage across the drain-to-source of the switch S2 shown in FIG. 2. The waveform 304 shows the current flowing through the switch S2. A dashed rectangle 401 illustrates the switching waveforms when the LLC resonant converter 200 operates at a switching frequency higher than the resonant frequency of the LLC resonant converter 200.

As shown in FIG. 4, the switching waveform 304 shows the body diode of the switch S2 conducts a current during a turn-off transition of the switch S2. The comparator 122 detects the drain-to-source voltage of the switch S2 and compares it with a predetermined threshold. In some embodiments, the predetermined threshold is about −0.6 V. Since the drain-to-source voltage of the switch S2 is less than the predetermined threshold in the dashed rectangle 401, a logic state "1" is generated at the output of the comparator 122.

The control circuit 124 receives the logic 1 from the comparator 122. In response to the logic 1, the control circuit 124 reduces the switching frequency of the switch network 102 and the rectifier 114 through the driver 126. The step of the switching frequency decrease is defined as Δfs shown in FIG. 4. The value of Δfs may vary depending on different application and design needs.

The comparator 122 keeps detecting the drain-to-source voltage of the switch S2 and sends a corresponding logic signal to the control circuit 124. The control circuit 124 reduces the switching frequency of the switch network 102 and the rectifier 114 until there is a logic state change. For example, after the switching frequency of the switch network 102 and the rectifier 114 has been reduced to a lower level (e.g., a level lower than the resonant frequency of the LLC resonant converter), the body diode of the switch S2 may not conduct a current during the turn-off transition of the switch S2.

A dashed rectangle 403 shows the switching waveforms when the body diode of the switch S2. Since the body diode does not conduct a current, the drain-to-source voltage of the switch S2 is higher than the predetermined threshold Vth as shown in FIG. 4. As a result, the comparator 122 may generate a logic 0.

In response to the logic 0 sent from the comparator 122, the control circuit 124 increases the switching frequency of the switch network 102 and the rectifier 114. The step of the switching frequency increase may be the same as the step of the switching frequency decrease. Alternatively, the step of the switching frequency increase may be different from the step of the switching frequency decrease depending on different applications and design needs.

As shown in FIG. 4, the arrows 405 and 407 indicate that the switching frequency of the switch network 102 moves back and forth at the boundary of body diode conduction. As such, the switch network 102 and the rectifier 114 may operate either at the resonant frequency or at a frequency close to the resonant frequency (e.g., Δfs from the resonant frequency).

Figure 5:
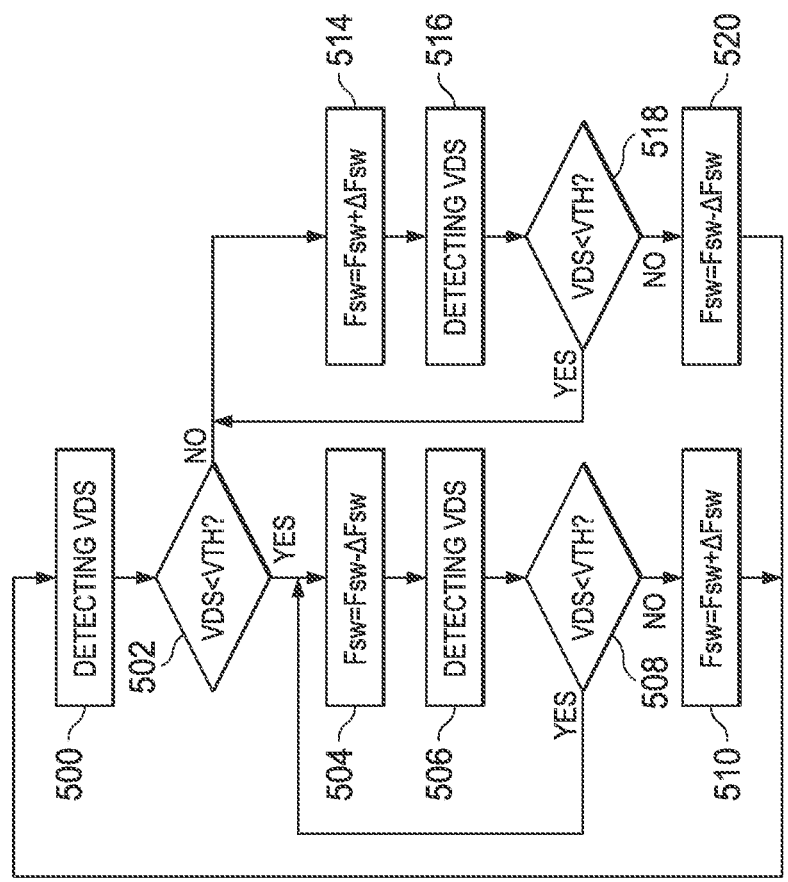
FIG. 5 illustrates a flow chart of a high efficiency control mechanism in accordance with various embodiments of the present disclosure.

FIG. 5 illustrates a flow chart of a high efficiency control mechanism in accordance with various embodiments of the present disclosure. At step 500, a drain-to-source voltage VDS of a secondary switch of an LLC resonant converter is detected and sent to a comparator. At step 502, if VDS<VTH, where VTH is a predetermined threshold, then the control mechanism executes step 504 wherein a control circuit reduces a switching frequency of the LLC resonant converter and sets Fsw=Fsw−ΔFsw. On the other hand, if VDS>=VTH, the control mechanism executes step 514, wherein the control circuit increases a switching frequency of the LLC resonant converter and sets Fsw=Fsw+ΔFsw.

At step 506, the comparator detects VDS again and compares VDS with VTH at step 508. If VDS<VTH, the control mechanism goes back to step 504 and executes step 506 subsequently. On the other hand, if VDS>=VTH, the control mechanism executes step 510, wherein the control circuit increases the switching frequency of the LLC resonant converter and sets Fsw=Fsw+ΔFsw, and then executes step 500 as shown in FIG. 5.

At step 516, the comparator detects VDS again and compares VDS with VTH at step 518. If VDS<VTH, the control mechanism goes back to step 514 and executes step 516 subsequently. On the other hand, if VDS>=VTH, the control mechanism executes step 520, wherein the control circuit increases the switching frequency of the LLC resonant converter and sets Fsw=Fsw−ΔFsw, and then executes step 500 as shown in FIG. 5.

It should be noted that in FIG. 5, when the switching frequency of the LLC resonant converter varies, both the switching frequency of the switch network 102 and the switching frequency of the rectifier 114 are changed accordingly.

Figure 6:
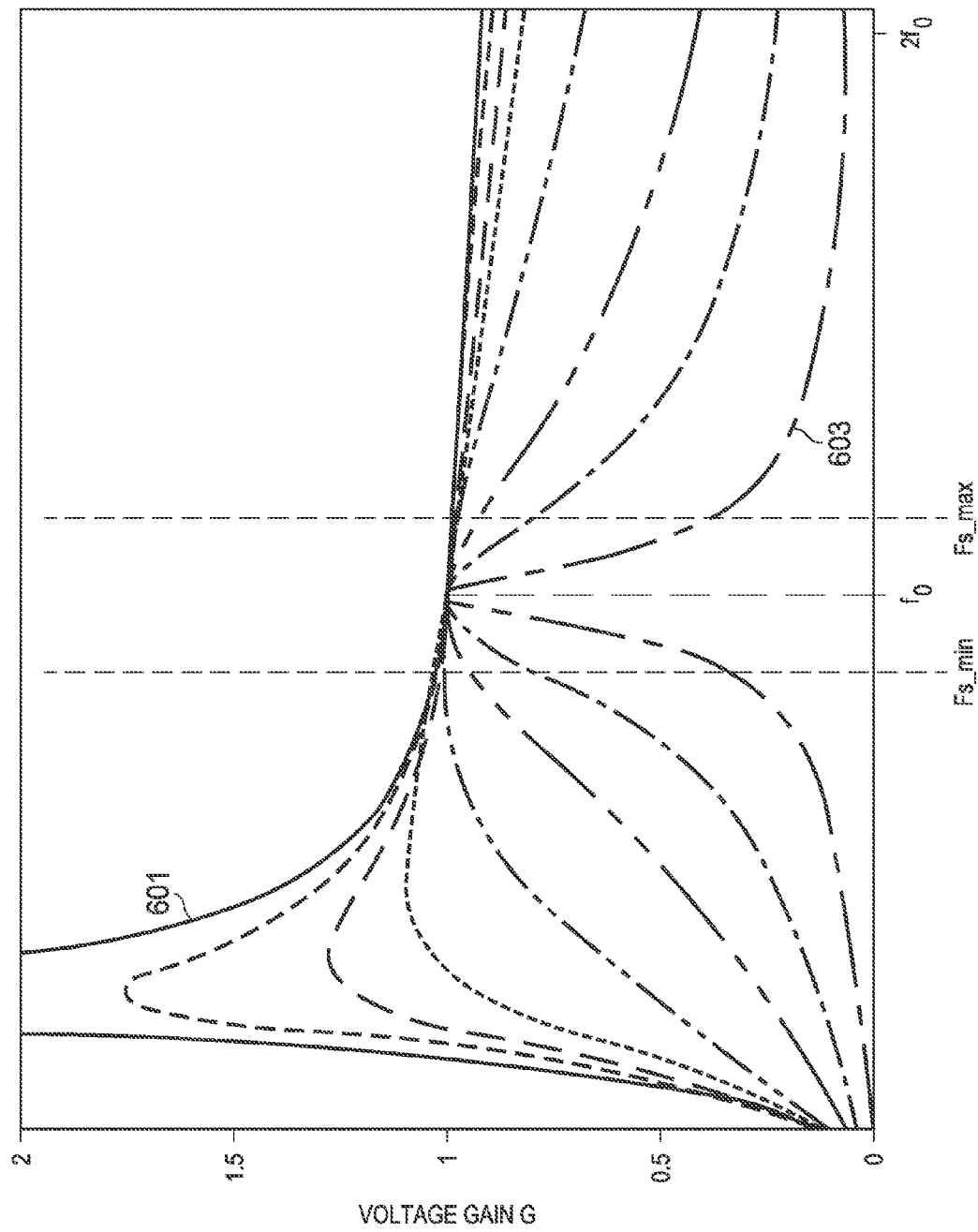
FIG. 6 illustrates the voltage gain of the LLC resonant converter shown in FIG. 2 in accordance with various embodiments of the present disclosure.

FIG. 6 illustrates the voltage gain of the LLC resonant converter shown in FIG. 2 in accordance with various embodiments of the present disclosure. The horizontal axis of FIG. 6 represents a switching frequency of the LLC resonant converter 200. The vertical axis of FIG. 6 represents a voltage gain of the LLC resonant converter 200. In some embodiments, when the switching frequency is equal to the resonant frequency (a.k.a. $f_o$) of the resonant tank, the voltage gain of the LLC resonant converter 200 is approximately equal to 1. In other words, when the switching frequency is equal to $f_o$ as shown in FIG. 6, the output voltage of the LLC resonant converter 200 is approximately equal to the input voltage of the LLC resonant converter 200.

In some embodiments, the resonant frequency $f_o$ is about 1 MHz. At the resonant frequency, the LLC resonant converter 200 may achieve high efficiency because of zero voltage switching and/or zero current switching.

FIG. 6 includes a plurality of curves, which illustrate the voltage gain variations depending different loads. For example, at a light load, the voltage gain (e.g., curve 601 shown in FIG. 6) of the LLC resonant converter 200 may be greater than that of a full load (e.g., curve 603 shown in FIG. 6).

FIG. 6 shows the LLC resonant converter 200 may be of different voltage gain characteristics depending on different switching frequencies. As described above with FIGS. 2-5, a high efficiency control mechanism of the LLC resonant converter 200 comprises detecting a signal across the drain and the source of the first transistor, comparing the signal with a predetermined threshold to generate a logic state and adjusting a switching frequency of the LLC resonant converter 200 based upon the logic state. However, the switching frequency adjustment based upon the logic state has a limit in order to prevent an EMI issue caused by a larger frequency shift from the resonant frequency.

As shown in FIG. 6, there may be a frequency band having an upper limit Fs_max and a lower limit Fs_min. The frequency band includes the resonant frequency of the resonant tank of the LLC resonant converter 200. The adjustment of the switching frequency of the LLC resonant converter 200 is limited by Fs_max and Fs_min. In other words, the high efficiency control mechanism shown in FIGS. 2-5 is capped by a frequency band.

In some embodiments, Fs_min is approximately equal to 90% of the resonant frequency. Likewise, Fs_max is approximately equal to 110% of the resonant frequency. In alternative embodiments, Fs_min is approximately equal to 95% of the resonant frequency. Likewise, Fs_max is approximately equal to 105% of the resonant frequency. It should be noted that the actual switching frequency of the LLC resonant converter 200 is within the frequency band. The selection of the frequency band may vary depending on different applications and design needs.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising: detecting a signal representing a drain-to-source voltage of a switch of a synchronous rectifier of an inductor-inductor-capacitor (LLC) resonant converter; comparing the signal with a predetermined threshold; generating a first logic state if the drain-to-source voltage is greater than the predetermined threshold; generating a second logic state if the drain-to-source voltage is less than the predetermined threshold; and in response to the first logic state and the second logic state, adjusting a switching frequency of the LLC resonant converter such that the LLC resonant converter moves back and forth across a boundary of body diode conduction, wherein, after the switching frequency of the LLC resonant converter has been adjusted, a frequency difference between the switching frequency and a resonant frequency of the LLC resonant converter is less than or equal to one frequency adjustment step and based upon the logic state, configuring the resonant converter such that a switching frequency of the resonant converter moves back and forth within a frequency band.

2. The method of claim 1, wherein:
the predetermined threshold is a body diode voltage of the switch.

3. The method of claim 2, wherein:
the body diode voltage is approximately equal to −0.6 V.

4. The method of claim 3, further comprising:
increasing the switching frequency of the LLC resonant converter until a first logic state change occurs when the resonant frequency is greater than the switching frequency.

5. The method of claim 4, further comprising:
after the first logic state change occurs, reducing the switching frequency of the LLC resonant converter until a second logic state change occurs.

6. The method of claim 5, further comprising:
after the second logic state change occurs, increasing the switching frequency of the LLC resonant converter until a logic state change similar to the first logic state change occurs.

7. The method of claim 1, further comprising:
reducing the switching frequency of the LLC resonant converter until a third logic state change occurs when the switching frequency is greater than the resonant frequency.

8. The method of claim 7, further comprising:
after the third logic state change occurs, increasing the switching frequency of the LLC resonant converter until a fourth logic state change occurs.

9. The method of claim 8, further comprising:
after the fourth logic state change occurs, reducing the switching frequency of the LLC resonant converter until a logic state change similar to the third logic state change occurs.

10. The method of claim 1, wherein the LLC resonant converter comprises:
a power stage comprising:
an input switch network coupled to a power source, wherein the input switch network comprises a plurality of power switches;
a resonant tank coupled to the plurality of power switches;
an isolation device coupled to the resonant tank; and
an output stage coupled to the isolation device through the synchronous rectifier;
a comparator coupled to the synchronous rectifier; and
a control circuit coupled to the power switches, wherein the control circuit generates a plurality of gate drive signals for the power switches.

11. The method of claim 10, further comprising:
a diode coupled between an input of the comparator and a drain of the switch, wherein:
a cathode of the diode is coupled to the drain of the switch; and
an anode of the diode is coupled to the input of the comparator; and
a bias voltage source coupled to the input of the comparator through a bias resistor.

12. A method comprising: detecting a drain voltage of a transistor of a resonant converter, wherein the resonant converter comprises: an input switch network coupled to a power source, wherein the input switch network comprises a plurality of power switches; a resonant tank coupled to the plurality of power switches; a transformer coupled to the resonant tank; and an output stage coupled to the transformer, wherein the output stage comprises the transistor; comparing the drain voltage with a predetermined voltage threshold, wherein: the drain voltage is coupled to a negative input of a comparator; and the predetermined voltage threshold is coupled to a positive input of the comparator; generating a logic state based upon an output of the comparator; and adjusting, by a control circuit, a switching frequency of the resonant converter based upon a result of comparing the drain voltage with a predetermined voltage threshold, wherein the control circuit is configured such that the resonant converter moves back and forth across a boundary between body diode conduction and transistor conduction, and based upon the logic state, configuring the resonant converter such that a switching frequency of the resonant converter moves back and forth within a frequency band.

13. The method of claim 12, further comprising:
when a resonant frequency of the resonant converter is greater than the switching frequency of the resonant converter, increasing the switching frequency of the resonant converter until a first logic state change occurs; and
after the first logic state change occurs, adjusting the switching frequency of the resonant converter such that the switching frequency of the resonant converter moves back and forth at the boundary between body diode conduction and transistor conduction.

14. The method of claim 12, further comprising:
when the switching frequency of the resonant converter is greater than a resonant frequency of the resonant converter, reducing the switching frequency of the resonant converter until a second logic state change occurs; and
after the second logic state change occurs, adjusting the switching frequency of the resonant converter such that the switching frequency of the resonant converter moves back and forth at the boundary between body diode conduction and transistor conduction.

15. The method of claim 12, further comprising:
when a resonant frequency of the resonant converter is greater than the switching frequency of the resonant converter, increasing the switching frequency of the resonant converter until the switching frequency is equal to a predetermined upper limit.

16. The method of claim 12, further comprising:
when the switching frequency of the resonant converter is greater than a resonant frequency of the resonant converter, reducing the switching frequency of the resonant converter until the switching frequency is equal to a predetermined lower limit.

17. A method comprising:
detecting a signal across a drain and a source of a transistor of a resonant converter, wherein the resonant converter comprises:
a power stage comprising:
an input switch network coupled to a power source, wherein the input switch network comprises a plurality of power switches;
a resonant tank coupled to the plurality of power switches;
an isolation device coupled to the resonant tank; and
an output stage coupled to the isolation device through a rectifier, wherein the rectifier comprises the transistor, and wherein a drain of the transistor is coupled to the isolation device and a source of the transistor is coupled to ground; and
a control circuit coupled to the power switches, wherein the control circuit generates a plurality of gate drive signals for the power switches;
comparing the signal with a predetermined threshold to generate a logic state; and
based upon the logic state, configuring the resonant converter such that a switching frequency of the resonant converter moves back and forth within a frequency band.

18. The method of claim 17, further comprising:
generating a logic 0 if the signal is greater than the predetermined threshold; and
generating a logic 1 if the signal is less than the predetermined threshold.

19. The method of claim 17, further comprising:
in response to the logic 0, increasing the switching frequency until the logic changes from 0 to 1; and
in response to the logic 1, decreasing the switching frequency until the logic changes from 1 to 0.

20. The method of claim 17, wherein:
the resonant converter is a half-bridge LLC resonant converter.

* * * * *